(12) United States Patent
Clanton (10) Patent No.: US 7,353,704 B2
(45) Date of Patent: Apr. 8, 2008

(54) STORAGE TANK EXTERNAL GAUGE SYSTEM

(76) Inventor: Shane H. Clanton, 205 Deer Hollow Dr., Horseshoe Bay, TX (US) 78657

( * ) Notice: Subject to any disclaimer, the term of this patent is extended or adjusted under 35 U.S.C. 154(b) by 323 days.

(21) Appl. No.: 11/179,938

(22) Filed: Jul. 13, 2005

(65) Prior Publication Data

US 2007/0012104 A1 Jan. 18, 2007

(51) Int. Cl.
*G01F 23/56* (2006.01)

(52) U.S. Cl. .............. 73/321; 73/319; 73/305; 242/615

(58) Field of Classification Search ............ 73/305, 73/323, 319, 321, 322, 158; 212/284, 196, 212/282; 49/151; 254/213, 266, 4 R, 384, 254/385, 390, 4 C, 393, 403, 411, 208; 114/102.21
See application file for complete search history.

(56) References Cited

U.S. PATENT DOCUMENTS

| | | | |
|---|---|---|---|
| 1,741,792 A | 12/1929 | Rinehart | |
| 1,879,805 A | 9/1932 | Jones | |
| 2,874,574 A * | 2/1959 | Patureau | 73/321 |
| 2,949,777 A | 8/1960 | Ferron | 73/321 |
| 3,090,232 A | 5/1963 | Mayes | 73/321 |
| 3,513,817 A * | 5/1970 | Kearsley | 123/552 |
| 4,817,227 A * | 4/1989 | Scott | 15/21.1 |
| 4,919,419 A * | 4/1990 | Houston | 482/138 |
| 5,050,432 A | 9/1991 | Barritt | 73/309 |
| D334,718 S * | 4/1993 | Basden et al. | D10/101 |
| 5,918,861 A * | 7/1999 | Parker | 254/326 |
| 6,460,908 B1 * | 10/2002 | Green | 293/117 |
| 2005/0235749 A1 * | 10/2005 | Morris | 73/313 |

\* cited by examiner

*Primary Examiner*—Hezron Williams
*Assistant Examiner*—Mark Shabman
(74) *Attorney, Agent, or Firm*—Christopher J. Whewell (57) ABSTRACT

Provided herein are devices useful for guiding cables, wires, cords, and the like. A device according to the present invention is particularly useful for guiding a cable that is used in providing an external liquid-level gauge on an oil tank. A cable guide means according to the present invention provides gauging means for judging the liquid levels in tanks which are more reliable than provided by the prior art, and which are essentially maintenance-free over their lifetime.

20 Claims, 6 Drawing Sheets

STORAGE TANK EXTERNAL GAUGE SYSTEM

TECHNICAL FIELD

This invention relates generally to tanks in which liquid substances are stored. More particularly, it relates to gauges which are affixed to an external surface of a storage tank, for indicating the level of a liquid substance inside the tank.

BACKGROUND

Above-ground tanks for storing liquids such as water and petroleum products have been in widespread use for over a century. In that time various devices have been contrived for enabling a workman associated with tank or tank farm maintenance to quickly judge the level of a liquid substance within a storage tank. One method for judging the level of a liquid in a tank includes a vertical tube mounted to an outside surface of a tank, with a weight suspended within the tube by a cable that is connected at its other end to a float contained within the tank through one or more pulleys. Prior art setups for this have been seen to be relatively complicated, as shown in U.S. Pat. Nos. 1,741,792 and 1,879,805. Such systems, with all their attendant components, make for an expensive way to do what should be a simple task.

Some workers, such as the inventors of U.S. Pat. D 334,718 have attempted to simplify external tank gauges. However, the design provided by these workers is not without inherent problems, as explained further in other parts of this specification. Thus, the present invention provides an inexpensive and reliable means for judging the liquid level in a tank by glancing at an external, mechanically-operated sight gauge.

SUMMARY OF THE INVENTION

The present invention provides devices useful for guiding cables, wires, and cords and the like. A device according to the invention comprises: a first frame member having a length dimension, a top portion, and a bottom portion; and a second frame member having a length dimension, a top portion, and a bottom portion. There is a first lower brace that is connectively attached to the bottom portion of the first frame member and the second frame member. There is an upper brace that is connectively attached to the top portion of the first frame member and the second frame member. There is further a first axle, having a length dimension, and the first axle is disposed between the first frame member and the second frame member such that the length dimension of the first axle is substantially perpendicular to the length dimension of the first and second frame members. The first axle further comprises a pulley rotably disposed on it. There is also a second axle, having a length dimension, and the second axle is disposed between the first frame member and the second frame member such that the length dimension of the second axle is substantially perpendicular to the length dimension of the first and second frame members. The second axle further comprises a second pulley rotably disposed on it as well.

BRIEF DESCRIPTION OF THE DRAWINGS

In the annexed drawings.

DETAILED DESCRIPTION

Figure 1:
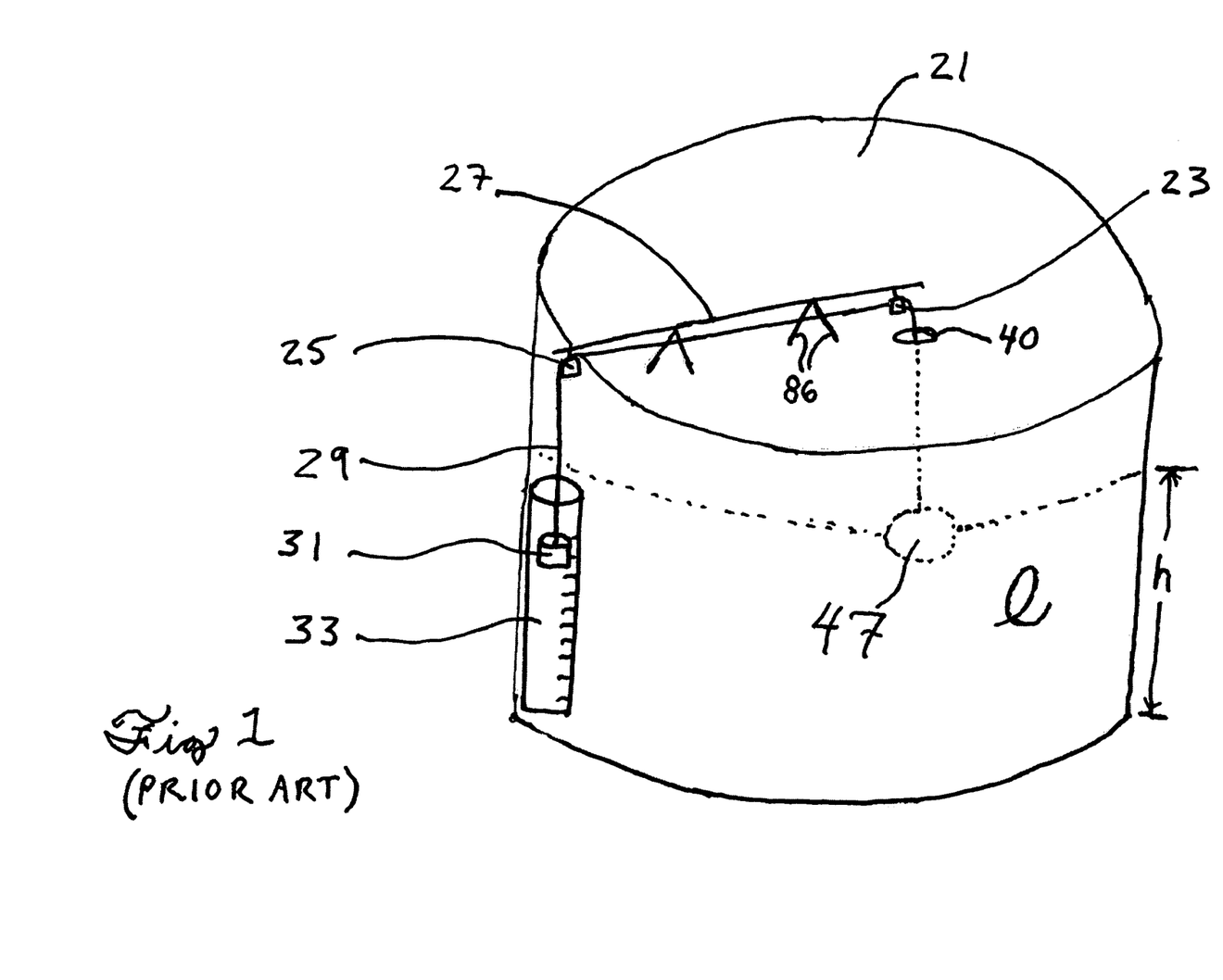
FIG. 1 shows a perspective view of a liquid storage tank having an external gauge according to the prior art.

Referring to the drawings and initially to FIG. 1 there is shown a liquid storage tank according to the prior art. Although liquid storage tanks may take on any physical shape, it is common for such tanks to be configured as a cylinder. In this FIG. 1, the storage tank contains a liquid 1, present at a height h. There is a gauge tube 33 that functions as a gauge that is mounted externally to the tank by means of conventional fastening means, such as brackets, screws, rivets or the like. The gauge tube 33 may comprise a hollow tube, made from a translucent material such as glass, methyl methacrylate, polycarbonate, polypropylene, etc., and preferably includes graduation marks on its surface. There is a weight 31 within the gauge tube 33, which weight serves as an indicator and is attached to a first end of a cable 29, wherein the second end of the cable is attached to a float 47 disposed within the tank through a hole 40. In this prior art embodiment, the cable 29 is supported by means of a framework which comprises a rod 27 that is supported by two pairs of "feet" 86, which may be comprised of shorter sections of the material from which rod 27 is fabricated, such as ¼" diameter rod stock, and which feet are simply welded to the rod 27. The rod 27 serves as a support from which pulleys 23 and 25 hang, thus enabling the cable 29 to pass from the weight 31, over pulley 25, through the underside of the "v" formed by each pair of legs, over pulley 23, and down into the tank 21 through the hole 40, where the second end of the cable 29 is attached to the float 47. Thus, observing the position of the weight 31 in relation to a graduated scale on the gauge tube enables one to glance at the gauge tube and have a fairly accurate understanding of the liquid level in the tank, as the length of cable, vertical position of the gauge tube on the exterior of the tank, and location of graduations on the tube are all readily adjustable by one of ordinary skill, so as to render easy calibration of the gauge to correspond with the level of the liquid in the tank.

Although useful, a system as shown in FIG. 1 is not without its drawbacks. For example, the cable guide means which comprises the rod 27, sets of feet 86, and pulleys 23 and 25 tends to be moved as a whole by environmental forces, particularly wind gusts, and possibly torque exerted by the cable tension being out of perfect alignment, over time, which can cause this cable guide means to be sufficiently skewed as to render the weight 31 to be non-indicative of the level of the liquid within the tank by virtue of attendant fouling of the pulleys, flipping over of the cable guide means, or other reasons.

Figure 2:
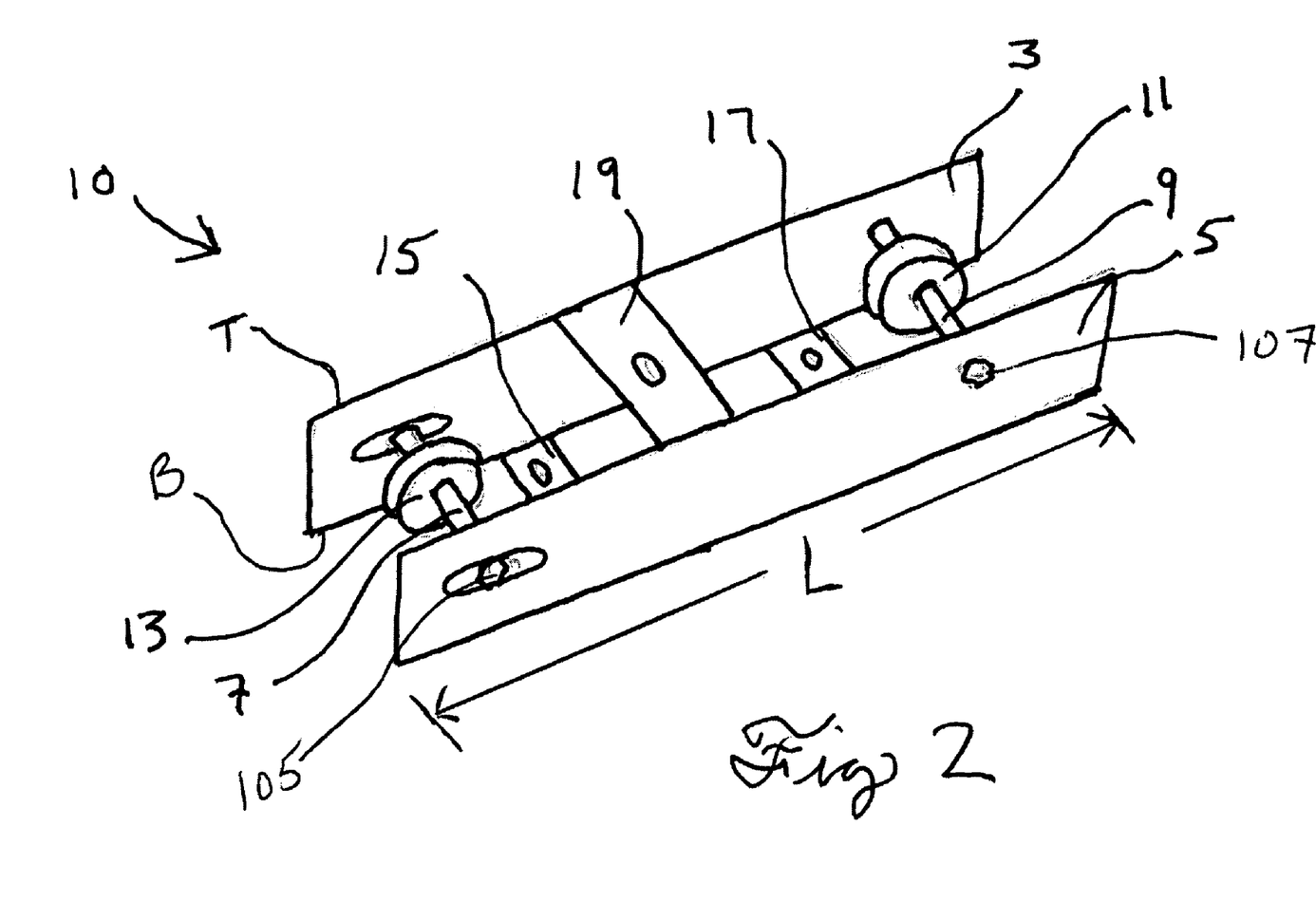
FIG. 2 shows a perspective view of a cable guide means according to one form of the present invention.

FIG. 2 shows a perspective view of a cable guide means according to one form of the present invention. There is a first frame member 3 having a length dimension indicated by L, a top portion T, and a bottom portion B. There is also a second frame member 5 having a corresponding length dimension, a top portion, and a bottom portion as well. The first and second frame members 3, 5 may be comprised of any material, including composites, polymers, wood, metals, alloys, etc. in a wide possible range of shapes and sizes; however, in a preferred embodiment the first and second frame members 3, 5 are preferably comprised of sheet metal, with stainless steel being especially preferred. In such an embodiment, the top portion T and bottom portion B of each frame member are edges; however, these could just as easily represent the top portion of a frame member which is comprised of, say, bar stock, rod stock, etc. There is a first lower brace 15 connectively attached to the bottom portion of said first frame member 3 and said second frame member 5. The first lower brace 15 may be comprised from any material, as aforesaid. However, in one preferred embodiment the first lower brace 15 is comprised of sheet metal, with a stainless steel being especially preferred. In a preferred embodiment, the first lower brace 15 includes a hole 66 through its surface, which is instrumental in attaching a cable guide means 10 according to the invention to the top of a storage tank. This may be accomplished by a machine screw (not shown) or other conventional fastening means disposed through the hole 66 and threadingly engaged with the top of the tank.

In one optional embodiment, there is a second lower brace 17 connectively attached to the bottom portion of said first frame member 3 and said second frame member 5. The second lower brace 17 may be comprised from any material, as aforesaid. However, in one preferred embodiment the second lower brace 17 is comprised of sheet metal, with a stainless steel being especially preferred. In a preferred embodiment, the first lower brace 17 includes a hole 68 through its surface, which is instrumental in attaching a cable guide means 10 according to the invention to the top of a storage tank.

One form of the invention also includes an upper brace 19 connectively attached to the top portion of the first frame member 3 and the second frame member 5. The upper brace 19 may be comprised from any material, as aforesaid. However, in one preferred embodiment the upper brace 19 is comprised of sheet metal, with a stainless steel being especially preferred. In a preferred embodiment, the upper brace 19 comprises a top surface and includes a hole 67 through its surface, which is instrumental in attaching a cover over the cable guide means 10 (FIG. 6) by means of a threaded stud, to protect the assembly from environmental conditions.

There is a first axle 7, having a length dimension, wherein said first axle 7 is disposed between the first frame member 3 and the second frame member 5 such that the length dimension L of the first axle 7 is substantially perpendicular to the length dimension of the first frame member 3 and the second frame member 5. The first axle 7 further comprises a first pulley 13 rotably disposed thereon, such that the first pulley 13 is free to rotate about the first axle 7.

There is a second axle 9, having a length dimension, wherein the second axle 9 is disposed between the first frame member 3 and the second frame member 5 such that the length dimension of the second axle 9 is substantially perpendicular to the length dimension L of the first frame member 3 and the second frame member 5. The second axle 9 further comprises a second pulley 11 rotably disposed thereon such that the second pulley 11 is free to rotate freely about the second axle 9.

Thus, in one form of the invention, the first and second frame members 3, 5 are each comprised of sheet metal shaped in a substantially rectangular configuration, with each having one hole disposed through its surface at positions corresponding to locations 105, 107 (FIG. 2) near each of their end portions, with the center of these holes being disposed preferably within about 1 to 3 inches from the end of the frame member. These holes serve as locations at which the axles 7, 9 are to be mounted or connectively attached at their ends to the first and second frame members respectively. In one embodiment, the holes through which the axles 7, 9 are mounted are round holes, and in another embodiment, they are oval shaped to enable adjustment of the position of an axle mounted within them. In one embodiment, the first lower brace 15 and second lower brace 17 are substantially square or rectangular pieces of sheet metal which are welded to the first and second frame members 3, 5 in one preferred embodiment their bottom edges. Similarly, the upper brace 19 is welded to each of the first and second frame members 3, 5 and in one preferred embodiment this is at their top edge. The first and second axles 7, 9 may be pieces of rod stock, or simply bolts, or any functional equivalent, which are then positioned in the holes in the first and second frame members at positions corresponding to locations 105 and 107. The first frame member 3 and second frame member 5 each have corresponding holes through which, or to which, the axle means 7, 9 are commonly disposed Thus, in one embodiment, a bolt which serves as axle 9 is inserted into a hole at 107, and then a pulley such as 11 is placed over the bolt/axle 9. Subsequently, the bolt is placed through the corresponding hole in the first frame member 3 and finally capped with a nut on its end. The other axle 7 may be similarly comprised. Alternatively, the axles 7, 9 may be rod stock which is welded into position after fitment of each with a pulley at locations corresponding to 105 and 107 on each of the frame members. In one embodiment, the pulleys may be any pulley which is sized to fit over the axles such that the pulley is freely rotatable.

Figure 3:
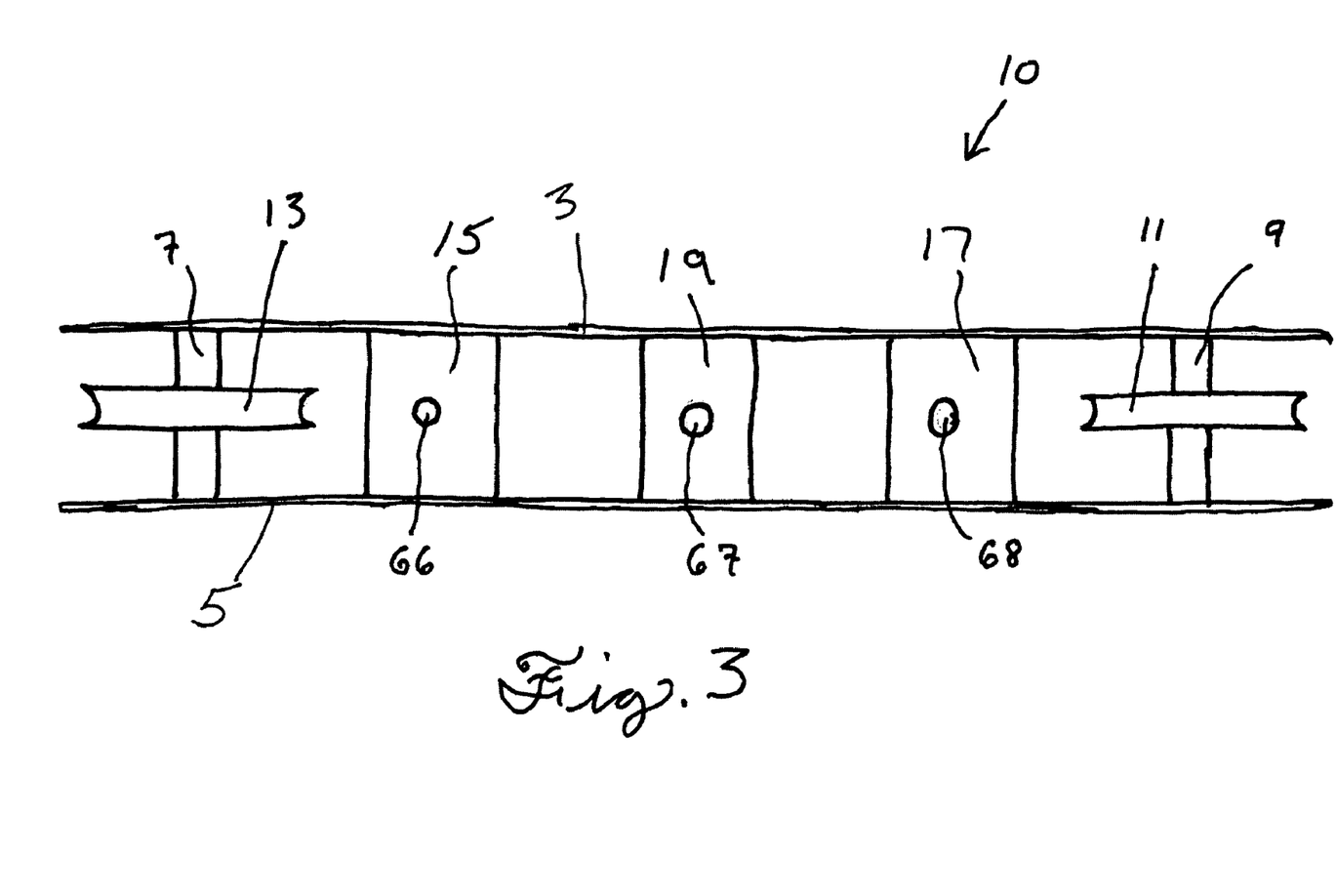
FIG. 3 shows and overhead view of a cable guide means according to one form of the present invention.

FIG. 3 shows and overhead view of a cable guide means 10 according to one form of the present invention. In this FIG. 3 are shown the respective positions of the various elements of such combination, including the first and second frame members 3, 5; upper brace 19; first lower brace 15; second lower brace 17; first axle 7; second axle 9; first pulley 11; and second pulley 13. An underside view of this same device appears identical to FIG. 3. Each of the upper brace 19; first lower brace 15; second lower brace 17 include holes (67, 66, 68 respectively) through them in this embodiment for reasons as explained elsewhere herein.

Figure 4:
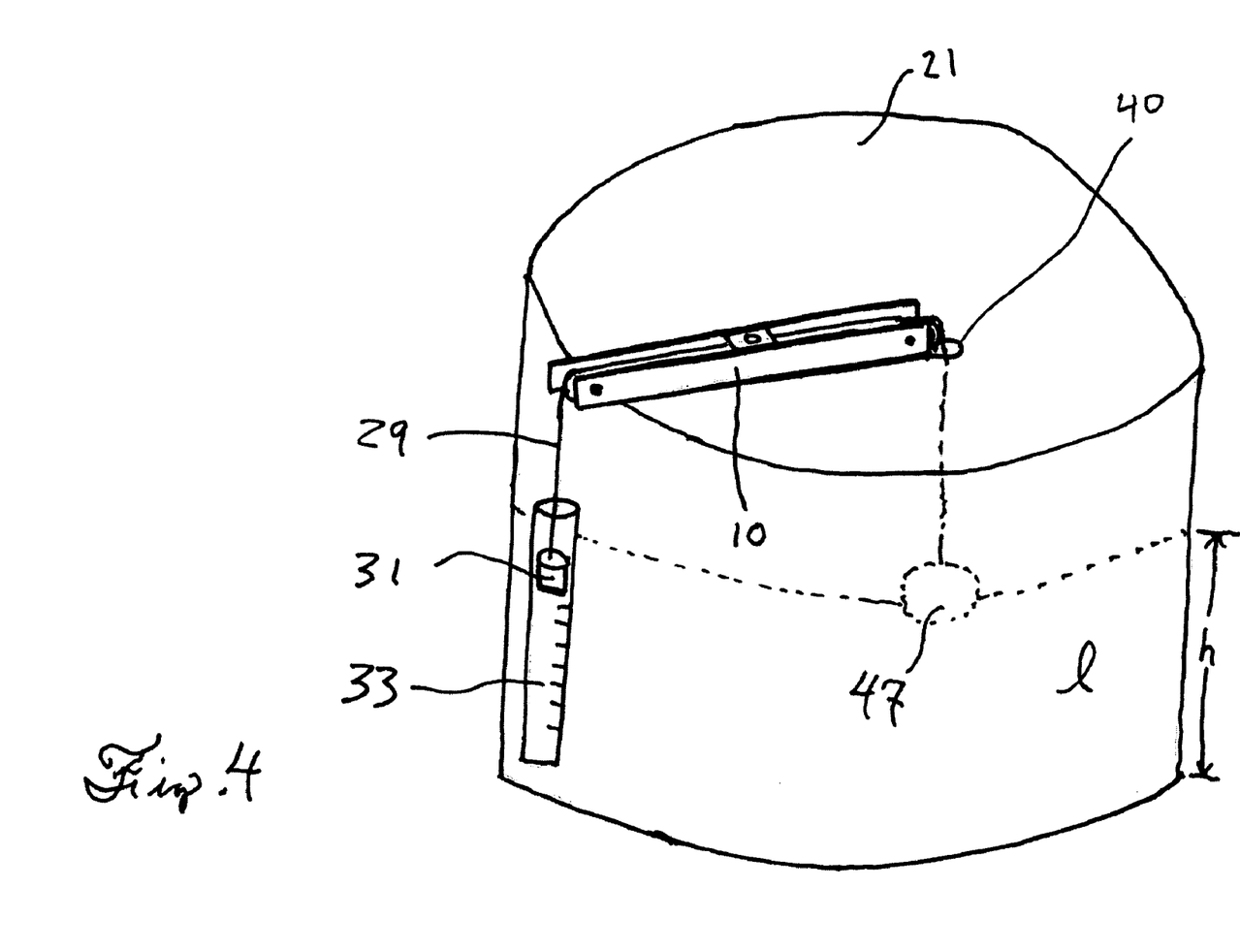
FIG. 4 shows a perspective view of a liquid storage tank having an external gauge according to one form of the present invention.

FIG. 4 shows a perspective view of a liquid storage tank 21 having an external gauge and utilizing a cable support means 10 according to one form of the present invention. In this FIG. 4, the device 10 from FIG. 2 is seen mounted to the top of an oil storage tank. There is a graduated gauge tube 33 having a weight 31 disposed within it, which is suspended by cable 29 and counterbalanced by the float 47 within the tank. The cable 29 which is attached at one of its ends to the float 47 and which is attached at its other end to the weight 31, passes from the float 47 through hole 40 in the top of the oil tank and over the first pulley. It then passes through a location that is between the first and second frame members 3, 5 of the cable guide means 10 and above the lower braces 15, 17 but below the upper brace 19 before passing over the second pulley on its way to the weight 31. Since the lower braces 15, 17 of the cable guide means 10 each have a hole disposed through them, the present cable guide means 10 is readily attached to the top of the oil tank 21 by the use of fasteners, such as machine screws disposed through the holes 66, 68 on the lower braces and threaded into the top of the tank itself. This provides the ability to fix the cable guide means rigidly in place, thus precluding its becoming fouled by environmental conditions or torque forces exerted by the float's repeated up and down movement over time, which is a major advantage for oil tanks equipped with such a cable guide means 10. Use of a cable guide means 10 according to the present invention in this regard renders sight gauges more reliable over time.

Figure 5:
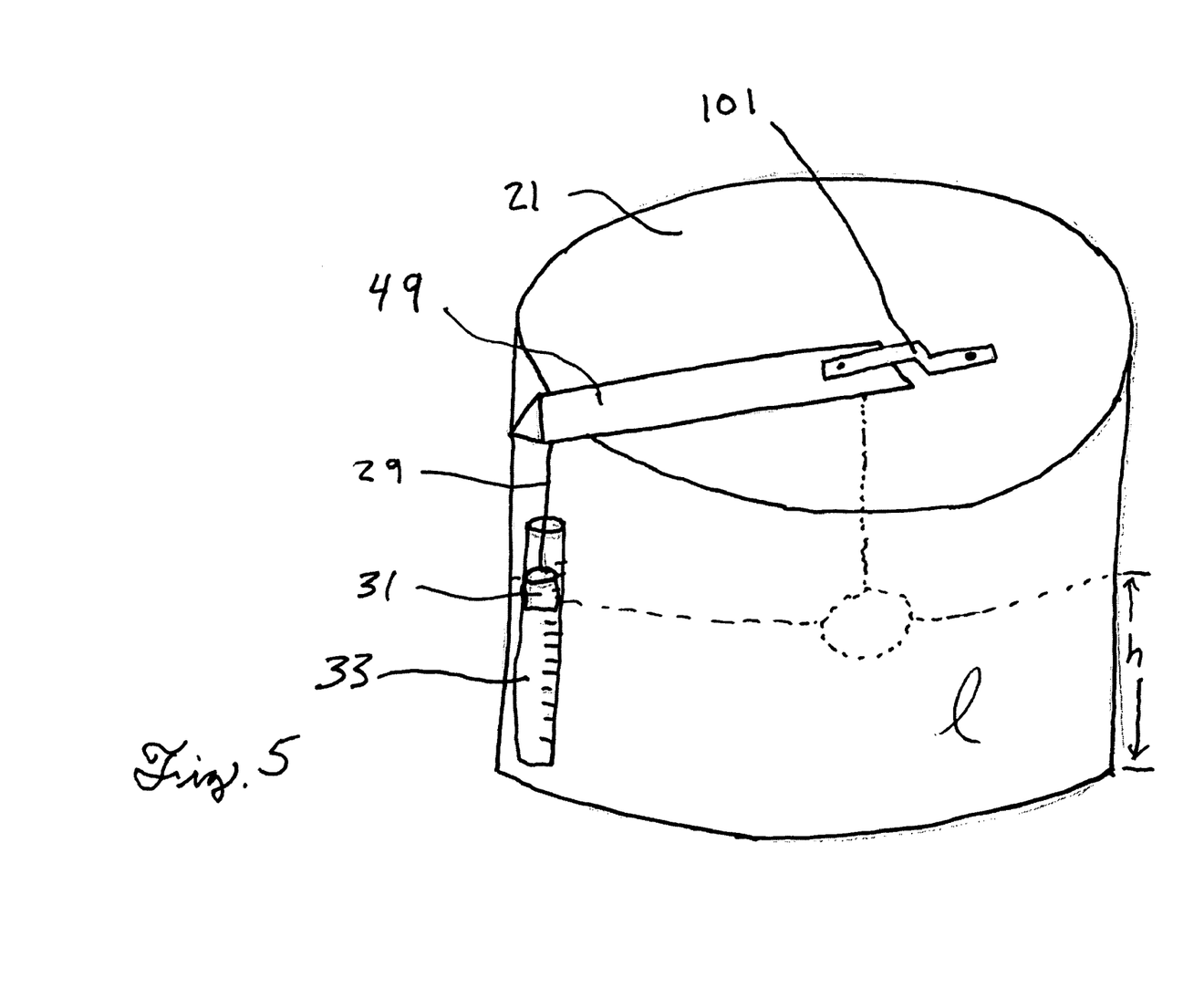
FIG. 5 shows a perspective view of a liquid storage tank having an external gauge according to one form of the present invention with a cover and optional stabilizer.
Figure 6:
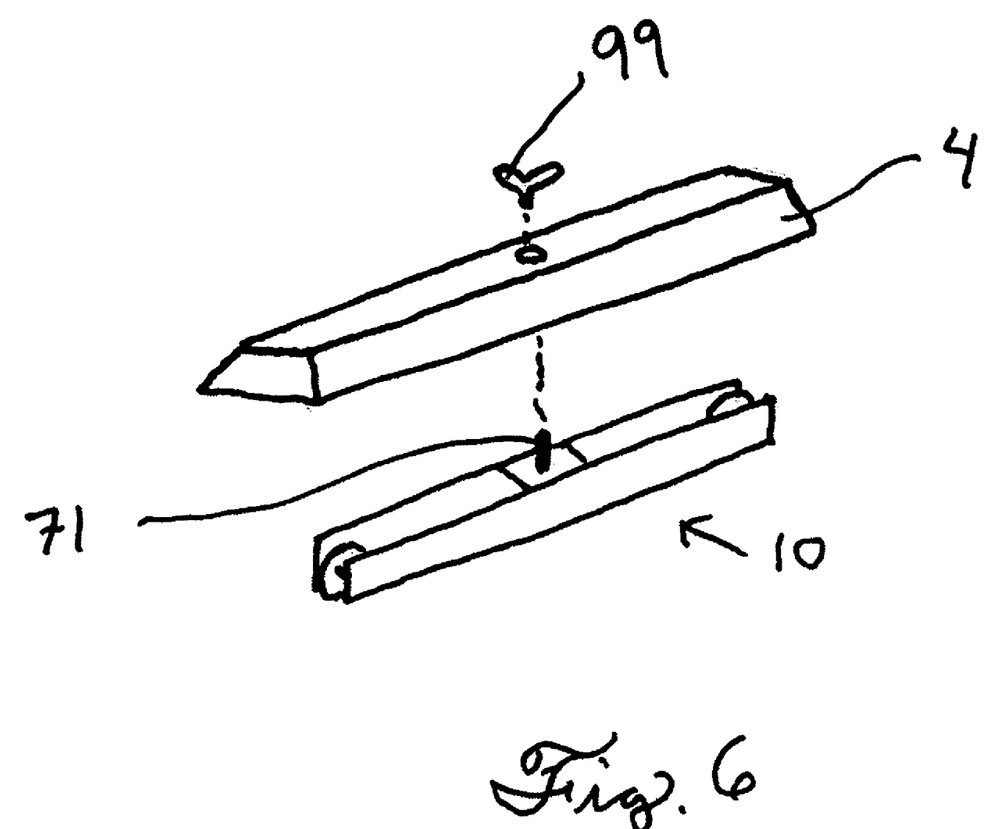
FIG. 6 shows and exploded view of a cable guide means according to one form of the present invention and a means by which it may be shielded from the environment.

FIG. 5 shows a perspective view of a liquid storage tank using a cable guide means according to one form of the present invention as shown in FIG. 4 and further comprising a cover 49 disposed over the cable guide means 10, thus placing the cable guide means out of view. Such provision has a wide utility, from keeping insects from building nests in the cable guide means, to keeping rain and ice from forming on the pulleys and cable. In one embodiment, the cover 49 is held in place by a stabilizer 101, which may be a strip of sheet metal that is screwed on one of its ends to the cover 49 and screwed on its other end to the top of the tank. In FIG. 6 is shown a preferred method for affixing a cover 49 to a cable guide means 10 according to the invention, by providing a stud 71 to be disposed on the upper brace in an upward orientation. Then, by providing a hole in the cover 49, the cover may be placed over the cable guide means 10 and secured in place with a wing nut 99.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. This includes subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. This also includes combination of the features and/or limitations of one or more of the independent claims with features and/or limitations of another independent claims to arrive at a modified independent claim, with the remaining dependent claims in their original text being read and applied to any independent claim so modified.

I claim:

1. A device useful for guiding cable, wire, and cord which comprises:
   a) a first frame member having a length dimension, a top portion, and a bottom portion;
   b) a second frame member having a length dimension, a top portion, and a bottom portion;
   c) a first lower brace connectively attached to the bottom portion of said first frame member and said second frame member;
   d) an upper brace having a top surface, connectively attached to the top portion of said first frame member and said second frame member;
   e) a first axle, having a length dimension, wherein said first axle is disposed between said first frame member and said second frame member such that the length dimension of said first axle is substantially perpendicular to the length dimension of said first and second frame members, said first axle further comprising a first pulley rotably disposed thereon;
   f) a second axle, having a length dimension, wherein said second axle is disposed between said first frame member and said second frame member such that the length dimension of said second axle is substantially perpendicular to the length dimension of said first and second frame members, said second axle further comprising a second pulley rotably disposed thereon,
   wherein said first and second pulleys are dimensioned sufficiently, and said axles are positioned sufficiently within said first and second frame members, to enable a linear cable that simultaneously contacts said first and second pulleys to reside beneath said top surface of said upper brace.

2. A device according to claim 1 wherein each of said first and said second axles are mounted between said first frame member and said second frame member through holes disposed through said frame members, wherein said holes have a shape selected from the group consisting of: round holes and oval-shaped holes.

3. A device according to claim 1 wherein said first frame member and said second frame member are comprised of sheet metal.

4. A device according to claim 1 wherein said first lower brace comprises a flat portion having a hole disposed therethrough.

5. A device according to claim 4 wherein said first lower brace is comprised of sheet metal.

6. A device according to claim 1 wherein said upper brace comprises a flat portion having a hole disposed therethrough.

7. A device according to claim 6 wherein said upper brace is comprised of sheet metal.

8. A device according to claim 1 further comprising: g) a second lower brace connectively attached to the bottom portion of said first frame member and said second frame member.

9. A device according to claim 8 wherein said upper brace is disposed between said first lower brace and said second lower brace as seen from an overhead view of said device.

10. A device according to claim 8 wherein said second lower brace comprises a flat portion having a hole disposed therethrough.

11. A device according to claim 8 wherein said second lower brace is comprised of sheet metal.

12. A device according to claim 8 wherein said upper brace comprises a flat portion having a hole disposed therethrough.

13. A device according to claim 12 wherein said upper brace is comprised of sheet metal.

14. A device according to claim 8 wherein said first frame member and said second frame member are comprised of sheet metal.

15. A device according to claim 8 wherein said first lower brace comprises a flat portion having a hole disposed therethrough.

16. A device according to claim 15 wherein said first lower brace is comprised of sheet metal.

17. A tank for storing liquids, said tank having an outside surface and a top portion, which comprises:
   a) a gauge tube vertically disposed on the outside surface of said tank;
   b) a float inside of said tank;
   c) a hole disposed in the top portion of said tank;
   d) a weight disposed within said gauge tube;
   e) a cable having a first end portion and a second end portion; and
   f) a device useful for guiding cable, wire, and cord which comprises:

i) a first frame member having a length dimension, a top portion, and a bottom portion;

ii) a second frame member having a length dimension, a top portion, and a bottom portion;

iii) a first lower brace connectively attached to the bottom portion of said first frame member and said second frame member;

iv) an upper brace having a top surface, connectively attached to the top portion of said first frame member and said second frame member;

v) a first axle, having a length dimension, wherein said first axle is disposed between said first frame member and said second frame member such that the length dimension of said first axle is substantially perpendicular to the length dimension of said first and second frame members, said first axle further comprising a first pulley rotably disposed thereon;

vi) a second axle, having a length dimension, wherein said second axle is disposed between said first frame member and said second frame member such that the length dimension of said second axle is substantially perpendicular to the length dimension of said first and second frame members, said second axle further comprising a second pulley rotably disposed thereon, wherein said first and second pulleys are dimensioned sufficiently, and said axles are positioned sufficiently within said first and second frame members, to enable a linear cable that simultaneously contacts said first and second pulleys to reside beneath said top surface of said upper brace, said device mounted in a fixed position on the top portion of said tank, wherein said float is connected to said first end portion of said cable, and wherein said weight is connected to said second end portion of said cable, said cable being in cooperative contact with each of said first pulley and said second pulley.

18. A tank according to claim 17, further comprising a cover disposed over said device useful for guiding cable, wire, and cord.

19. A tank according to claim 17, wherein said device useful for guiding cable, wire, and cord further comprises: g) a second lower brace connectively attached to the bottom portion of said first frame member and said second frame member.

20. A tank according to claim 19, further comprising a cover disposed over said device useful for guiding cable, wire, and cord.

* * * * *